United States Patent Office 2,875,161
Patented Feb. 24, 1959

2,875,161

POLYAMINE DERIVATIVES OF ALKYL SUBSTITUTED BENZENES

Alfred R. Bader, Milwaukee, Wis., and John E. Hyre, Cambridge, Mass., assignors to Pittsburgh Plate Glass Company, Allegheny County, Pa.

No Drawing. Application October 21, 1954
Serial No. 463,802

4 Claims. (Cl. 260—2.1)

This invention relates to novel and valuable polyamines of aralkyl compounds or the hydrohalides thereof and it pertains particularly to polyamine derivatives of alkyl substituted benzenes and to methods for the preparation of the same.

Heretofore, haloalkyl derivatives of alkylbenzenes have been prepared by reacting an alkylbenzene such as xylene, and particularly meta xylene, with an aldehyde such as formaldehyde, in the presence of hydrogen chloride or other hydrogen halide. It is thus possible to prepare compounds embodying the general molecular structure:

$$Ar(CH_2-X)_n$$

wherein Ar is an alkyl substituted aryl radical, X is halogen such as chlorine or bromine and $n$ is a whole number from 1 to 3. The "alkyl" groups attached to the aryl radical are preferably methyl, but may also be ethyl, propyl, butyl, or the like. Groups or radicals required to satisfy the carbons in the benzene ring and which are not alkyl or halomethyl (—CH$_2$Cl) groups may be hydrogen, chlorine, bromine, or the like. An outstanding example of such compounds is 4,6-di(chloromethyl)m-xylene, which may also be termed dichlorodurene.

This invention is based upon the discovery that the halomethyl derivatives of alkylaromatic compounds, such as 4,6-di(chloromethyl)m-xylene, will readily react with ammonia to replace halogen whereby to form polyamines which are high melting solids. In the reaction, hydrochloric acid is released and this is believed to react with the amines to form polyamine salts.

The general reaction is illustrated by the reaction of 4,6-di(chloromethyl)m-xylene and ammonia, which may proceed in accordance with the equation:

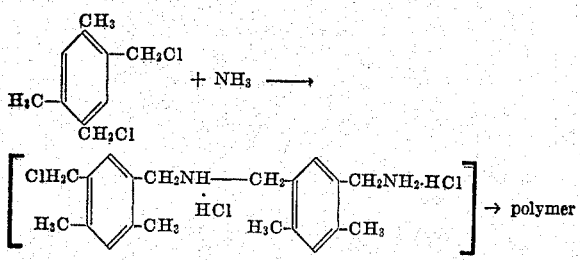

This invention is not dependent for validity upon the accuracy of the equation but depends broadly upon the reaction of ammonia with the starting compound to form a polyamine or a hydrohalide thereof in which halogen in the side chains is replaced by ammonia.

These polyamines may be employed as ion exchange resins and for other purposes.

The preparation of 4,6,-di(chloromethyl)m-xylene suitable for reaction with ammonia to form polyamines in accordance with the provisions of the present invention broadly comprises reacting an aralkyl compound (preferably meta xylene, or its homolog, mesitylene) with an aldehyde, such as formaldehyde, and a concentrated hydrogen halide, such as hydrochloric acid. The reaction takes place readily at moderate temperatures, for example 90° C. or thereabouts. In the reaction, a catalyst such as zinc chloride or the like may be employed.

The preparation of 4,6-di(chloromethyl)m-xylene is illustrated by the following example:

Example I

The reaction mixture comprised:

| | | |
|---|---|---|
| m-Xylene | grams | 848 |
| Formalin (37 percent aqueous) | do | 1740 |
| HCl (concentrated aqueous) | cc | 1200 |
| Zinc chloride (catalyst) | grams | 40 |

This mixture was introduced into a flask and hydrogen chloride was bubbled through for 18 hours. When the reaction mixture was cooled, crystals formed and were filtered off and were washed with water. They were then recrystallized once from heptane. The yield was 869 grams of the desired 4,6-di(chloromethyl)m-xylene in relatively pure form melting at 93° C. to 96° C., useful for reaction with ammonia to form polyamines or salts thereof in accordance with the provisions of the present invention. The latter reaction is illustrated by the following example:

Example II

Ten grams of 4,6-di(chloromethyl)m-xylene was dissolved in 100 milliliters of ethanol on a steam bath. Anhydrous ammonia gas was bubbled through the refluxing solution. After a period of 30 minutes a nicely crystalline white solid was observed to be forming. After a period of 1 hour the reaction mixture was cooled and the crystalline product was filtered in a yield of 9.5 grams. This product softens above 200° C.

The product is believed to be a hydrochloride salt of a polyamine of durene. It contains the necessary amino groups and anions (Cl) usually characterizing well known anion exchange resins referred to in the book Ion Exchange Resins by Kunin and Myers copyrighted by John Wiley and Sons, Inc., New York, 1950.

Example III

In this example, aqueous ammonia (ammonium hydroxide) is employed to react with 4,6-di(chloromethyl)-m-xylene to form polyamines.

To 300 milliliters of ammonium hydroxide was added 10 grams of 4,6-di(chloromethyl)m-xylene dissolved in 100 milliliters of hot ethanol. A precipitate formed immediately. The mixture was heated at the boiling point for 30 minutes. Cold water (200 milliliters) was added and the mixture was cooled to room temperature. The product was a rock-hard amorphous solid. This product may be used as an ion exchange resin.

It is to be understood that formaldehyde in Example I may be replaced by acetaldehyde, propionaldehyde, butyraldehyde, or the like. The chloroalkyl groups in 4,6-di(chloromethyl)m-xylene will then be replaced by the corresponding chloroethyl, chloropropyl, or chlorobutyl groups.

In Example I, m-xylene may be replaced by mesitylene (1,3,5-trimethylbenzene) to form di(chloromethyl)mesitylene. The latter may be reacted with ammonia in accordance with the provisions of this invention to form polyamines (or their hydrochloride salts) useful as ion exchange media. Likewise, the mono- or trihaloalkyl-aromatic compounds may be substituted for the dihalo compounds of the examples.

The forms of the invention as herein given are to be considered as being by way of illustration. It will be apparent to those skilled in the art that numerous modi-

We claim:
1. In a method of preparing a hydrochloride salt of a polyamine of a tetramethylbenzene, the steps which comprise dissolving di(chloromethyl)xylene in ethyl alcohol and contacting the solution at about refluxing temperature with anhydrous ammonia in gaseous phase whereby to precipitate said salt and removing the salt.

2. In a method of forming a hydrochloride salt of a polyamine of an aromatic hydrocarbon of a class consisting of a xylene and mesitylene, the steps which comprise dissolving a compound of a class consisting of di(chloromethyl)xylene and di(chloromethyl)mesitylene in ethyl alcohol and refluxing the mixture with ammonium hydroxide until said salt is formed and precipitated.

3. In a method of forming a hydrochloride salt of a polyamine of an aromatic hydrocarbon of a class consisting of a xylene and mesitylene, the steps which comprise dissolving a compound of a class consisting of a di(chloromethyl)xylene and di(chloromethyl)mesitylene in ethyl alcohol and bubbling anhydrous ammonia gas through the mixture while it is heated to reflux temperature and separating the resultant precipitated salt.

4. In a method of forming a hydrochloride salt of a polyamine of di(aminomethyl)-xylene, the steps of heating to the boiling point a solution of di(chloromethyl)xylene and ethyl alcohol and contacting the solution with a compound of a class consisting of anhydrous ammonia and ammonium hydroxide, heating being continued until said salt is formed and precipitated.

References Cited in the file of this patent

UNITED STATES PATENTS

| | | |
|---|---|---|
| 2,268,620 | Rigby | Jan. 6, 1942 |
| 2,411,141 | Adams | Nov. 19, 1946 |
| 2,411,142 | Kelso et al. | Nov. 19, 1946 |
| 2,640,080 | De Tar et al. | May 26, 1953 |